United States Patent
Roelleke

(10) Patent No.: US 7,416,210 B2
(45) Date of Patent: Aug. 26, 2008

(54) METHOD AND DEVICE FOR CONTROLLING THE TRIGGERING OF PASSIVE SAFETY SYSTEM AND THE USE THEREOF

(75) Inventor: Michael Roelleke, Leonberg-Hoefingen (DE)

(73) Assignee: Robert Bosch GmbH, Stuttgart (DE)

( * ) Notice: Subject to any disclaimer, the term of this patent is extended or adjusted under 35 U.S.C. 154(b) by 467 days.

(21) Appl. No.: 10/483,923

(22) PCT Filed: Jun. 25, 2002

(86) PCT No.: PCT/DE02/02317

§ 371 (c)(1),
(2), (4) Date: Aug. 25, 2004

(87) PCT Pub. No.: WO03/008239

PCT Pub. Date: Jan. 30, 2003

(65) Prior Publication Data

US 2005/0012312 A1 Jan. 20, 2005

(30) Foreign Application Priority Data

Jul. 14, 2001 (DE) .................. 101 34 331

(51) Int. Cl.
*B60R 21/16* (2006.01)
(52) U.S. Cl. ................................. 280/735
(58) Field of Classification Search ............ 280/735, 280/734; 180/271, 274, 282
See application file for complete search history.

(56) References Cited

U.S. PATENT DOCUMENTS 6,158,556 A * 12/2000 Swierczewski ............ 188/5
6,246,937 B1 * 6/2001 Miyaguchi et al. .......... 701/45

FOREIGN PATENT DOCUMENTS

| DE | 36 08 525 | 9/1987 |
|---|---|---|
| DE | 100 10 905 | 11/2000 |
| DE | 199 36 819 | 9/2001 |
| WO | 98 58822 | 12/1998 |
| WO | 02 04258 | 1/2002 |

OTHER PUBLICATIONS

Phen et al., *Occupant Protection Advanced Technology*, Jet Propulsion Lab Progress Report, Apr. 1998, ¶5.2.2.2.

* cited by examiner

*Primary Examiner*—Faye M. Fleming
(74) *Attorney, Agent, or Firm*—Kenyon & Kenyon LLP

(57) ABSTRACT

A method and device for controlling the triggering of passive safety systems, such as airbags in vehicles, in response to criteria being detected that are to be interpreted as the existence of a dangerous impact. One of these criteria is the impact speed. A measure of the impact speed is ascertained in that first the instant of the impact onset of the vehicle against an obstacle is detected and then the instant is detected when the acceleration of the rigid support structure of the vehicle transitions from light to heavy acceleration. The time difference between the impact-onset instant and the acceleration-transition instant is a measure of the impact speed. To ascertain the instants, integral values of acceleration signals from acceleration sensors may be utilized and analyzed in an appropriate manner. The method and device are applicable, in particular, in the discrimination of impact processes at low driving speeds.

24 Claims, 3 Drawing Sheets

METHOD AND DEVICE FOR CONTROLLING THE TRIGGERING OF PASSIVE SAFETY SYSTEM AND THE USE THEREOF

FIELD OF THE INVENTION

The present invention relates to a method and a device for controlling the triggering of passive safety systems, such as airbags in motor vehicles, in response to criteria being detected that must be interpreted as the presence of a dangerous impact; it also relates to the use of the method and the device.

BACKGROUND INFORMATION

To protect passengers in a motor vehicle, the vehicles are increasingly equipped with production passive safety systems, in particular with airbags. Depending on the type and severity of the specific impact, the airbags are to be triggered in such a way that the particular passenger of the vehicle strikes the inflated airbag with sufficiently gentle force and is decelerated. It is usual, for example, to ignite an airbag in two stages and to control the time interval between the two ignition procedures. The control of the triggering classically occurs when the abrupt braking of the vehicle upon impact against an obstacle exceeds a threshold value, this control being implemented with the aid of an acceleration sensor, which is affixed on the rigid support structure of the vehicle and assigned to the control unit. Avoiding erroneous activation becomes increasingly more important, especially at low driving speeds. For reasons of product liability, but also because of testing regulations mandated by law for type approval, the impact velocity, in particular at low driving speeds, must be detected as accurately as possible, at least with respect to the magnitude, so that low speeds that are in close proximity to each other are also able to be discriminated. This is not possible with speed sensors commonly used in motor vehicles, at least in those cases where the conventional measuring tolerances of ∓10% are insufficient to reliably implement the discrimination, especially since additional variation parameters such as vehicle aging and the like must be taken into account.

Therefore, it is an object of the present invention to indicate a possibility of ascertaining a utilizable measure for the impact velocity, in particular at low vehicle speeds.

According to the present invention, what is achieved is the recognition that a certain time interval elapses between the first impact against an obstacle and the deformation onset of the rigid parts of the vehicle structure during which deformable parts of the vehicle structure are deformed. This time characteristic of the impact velocity is essentially proportional and may thus be utilized as a measure for the impact velocity. While this is true only for barriers that are identical in rigidity and mass, this happens to be the case in test regulations. It is particularly important to detect the impact onset, for example with the aid of an impact switch, and to detect the transition from light to heavy acceleration or delay. In particular the latter instant may be established by analyzing the integral values of acceleration signals.

This makes it possible at low vehicle speeds to distinguish even among vehicle speeds that are in close proximity to each other and thus to comply with the US requirement according to NHTSA 208, for example, in the low-risk deployment range. The corresponding requirement, namely to differentiate between a frontal impact against a rigid barrier as the obstacle at 26 km/h and at 32 km/h may thus be met. On the same basis, it is also possible to classify the degree of overlap, in particular in order to ascertain whether the given overlap amounts to 100%, in accordance with the aforementioned regulation. Furthermore, in combination with other criteria, a conclusion may be reached on the same basis as to whether or not an impact against a hard barrier has occurred.

The obtained data may then be utilized in a variety of algorithms to influence the triggering conditions, possibly together with additional criteria.

DETAILED DESCRIPTION

Figure 1:
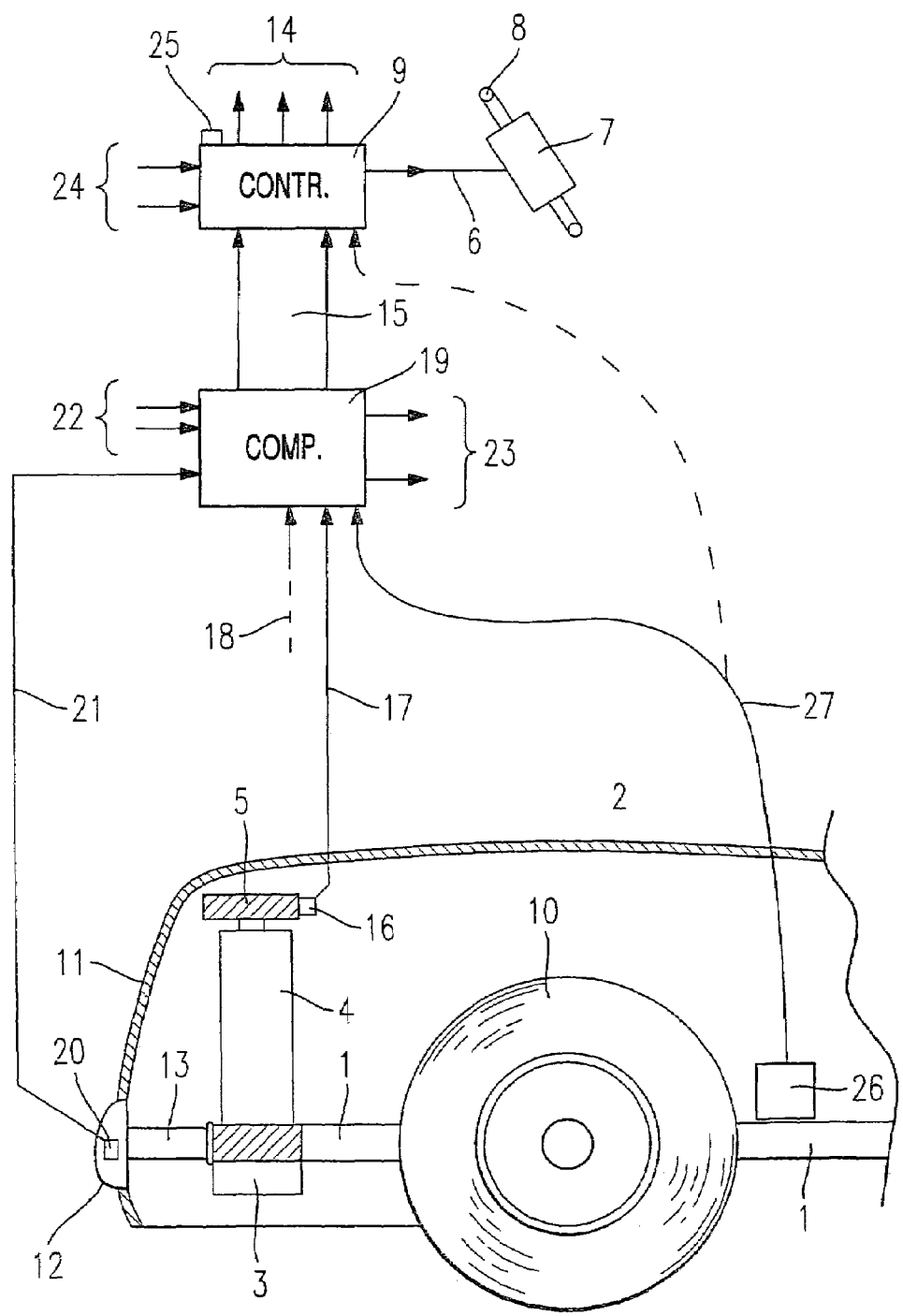
FIG. 1 schematically, the assignment of various sensors and evaluation and computing circuits with respect to the control of the triggering of an airbag according to the present invention.

FIG. 1 schematically shows two rigid frame longitudinal members 1 in the front section of a vehicle 2, a lower cross member 3 and an upper cross member 5 of a rigid support structure, a radiator 4 being disposed between the two cross members 3 and 5. The longitudinal frame members 1 may be a right-side and a left-side member 1. Projecting beyond this support structure, toward the front, in particular as an extension of longitudinal members 1, is an easily deformable rail 13, which supports a bumper assembly 12 in the region of an engine hood 11. Furthermore, a front wheel 10 of the front region of vehicle 2 is illustrated.

Provided in the usual way in the interior of vehicle 2 are passive safety systems that are able to be triggered, such as belt tighteners, front airbags, side airbags and the like. FIG. 1 schematically shows a front airbag 7 integrated into a steering wheel 8, the airbag's propellant charge(s) being able to be triggered by a control 9 via a line 6. Control 9 receives a number of input signals 24 of state variables of vehicle 2. On the basis of such input signals 24 it evaluates whether criteria are present that may indicate the occurrence of an accident that would warrant the triggering of the particular passive safety system(s), such as airbag 7, in order to protect the passenger assigned to the particular safety system. Thus, control 9 may emit additional output signals 14 so as to trigger additional passive safety systems, also including such signals that relate to the triggering of passive safety systems for another passenger.

An essential criterion for the triggering of the passive safety systems is the presence on an impact against an obstacle such as a barrier or another vehicle driving ahead or approaching from the other direction. It has been shown that the premature or unnecessary triggering of an airbag is extremely dangerous. On the other hand, if an accident has occurred, a belated triggering of an airbag is dangerous.

This has induced legislators in at least some countries to prescribe very precise test criteria for type approval, which in turn necessitates the ability to detect the state criteria of the vehicle on which the test criteria are based with as much accuracy as possible and without a time delay. A typical example is the U.S. regulation NHTSA 208, which, among others, requires a differentiation between a frontal impact (crash) against a rigid barrier as the obstacle at 26 km/h and at 32 km/h. In the latter case, an impact angle of between 0° and 30° should also still be possible. Overall systems of vehicle and sensory system having conventional sensors to measure speeds have a typical measuring tolerance of ∓10%, which already seems to make it barely possible to differentiate between the two speeds. Furthermore, the sensors and also the other components of the overall system are subject to fluctuations due to manufacturing tolerances and/or aging. Moreover, there is also a dependency on the engine type and the load, which is likewise not negligible.

If the typical measuring tolerance of the speed sensor is not to be substantially lowered, which comes close to technical and cost limits, additional criteria that are independent of the sensors must be ascertained.

This is schematically illustrated in FIG. 1 by additional input signals 15 to control 9. To generate such additional input signals 15, the present invention provides that input signals coming from sensors provided on vehicle 2 be computationally processed in an evaluation circuit 19 as explained in the following.

According to the present invention, the onset of the impact is detected, which in the exemplary embodiment shown in FIG. 1 is accomplished with the aid of an impact switch 20 arranged in bumper assembly 12 or on deformable rail 13. The signal from impact switch 20 is supplied to evaluation circuit 19 via a line 21. Furthermore, as closely as possible in the front but on the rigid support structure, an acceleration sensor 16 is provided, whose output signal is supplied to evaluation circuit 19 via a line 17. Providing such an acceleration sensor 16 has basically already been proposed in the prior patent application 101 . . . (internal file number R.38585), in order to realize an early triggering instant with respect to an optimal adjustment to the impact severity and to improve the avoidance of erroneous triggering. In place of one such acceleration sensor 16, it is also possible to provide two such acceleration sensors 16, arranged symmetrically to the vehicle longitudinal axis and, correspondingly, two lines 17 and 18 to evaluation circuit 19. As further discussed below, this may have additional advantages in the case at hand.

According to the prior application, however, the signal generated by acceleration sensor 16 is used in trigger circuit 9 to set a trigger threshold.

In contrast, according to the present invention, the output signal of acceleration sensor 16 is utilized to determine a second instant at which the impact against the obstacle impinges upon the rigid support structure of vehicle 2, which manifests itself, in particular, by the deformation of longitudinal members 1.

Figure 2:
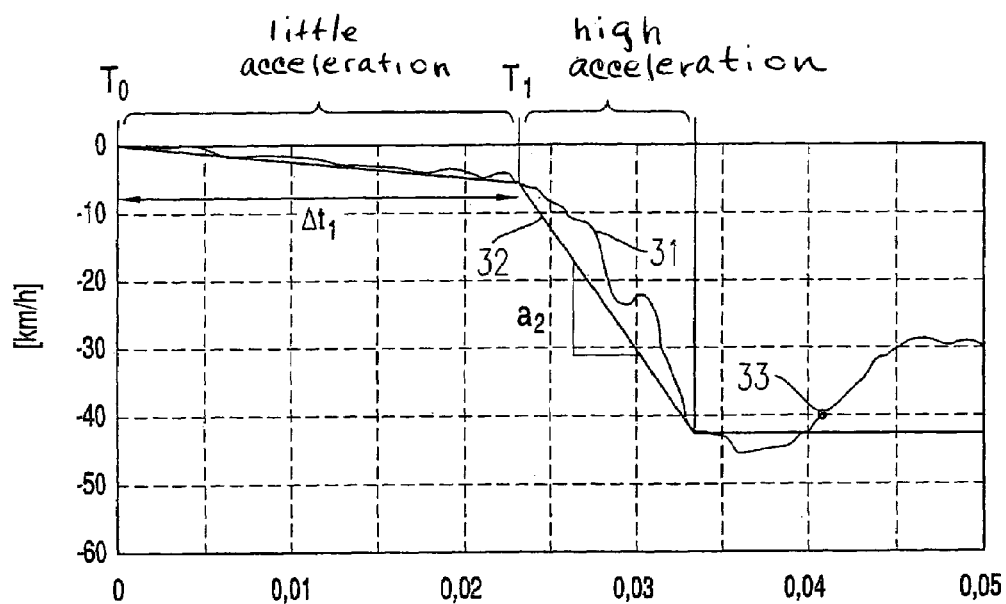
FIG. 2 schematically, the basic profile of detectable signals in an impact.

This shall be explained on the basis of FIG. 2, which schematically illustrates the speed characteristic over time at the location of acceleration sensor 16 in a vehicle 2, the vehicle front crashing against a deformable obstacle at a speed of 45 km/h with a 40% overlap. At an instant T0, impact switch 20 detects the impact of vehicle 2 against an obstacle. If an acceleration sensor is used, for example an acceleration sensor 25 or 26 discussed in greater detail below, instead of an impact switch 20 responding without delay, instant T0, for system-related reasons and largely independent of the impact speed, occurs approximately 2 to 3 ms after bumper assembly 12 first makes contact with the obstacle, at least at low speed. As time progresses, deformable rail 13 deforms at acceleration sensor 16 with less of a speed delay. At an instant T1, deformable rail 13 is completely deformed and the rigid support structure, such as longitudinal member 1, thereupon begins to deform, resulting in a very heavy delay at acceleration sensor 16 and thus a very high speed deceleration, which is represented by the pronounced gradient a2 of the corresponding idealized profile. While this impact process runs its course, evaluation circuit 9 ascertains on the basis of signals (signals 13) it receives at which instant 33 airbag 7 must be inflated.

This heavy delay in the region of acceleration sensor 16 is the greater (steeper gradient a2) the more flexible the mounting means for affixing acceleration sensor 16 on the support structure of vehicle 2. In identical obstacles or barriers and otherwise identical impact conditions (impact angle, overlap etc.) it is possible to draw conclusions regarding impact velocity $V_{close}$ from the time difference between T0, the impact-onset instant and instant T1, the acceleration transition instant and time difference $\Delta t1$, since $$\Delta t1 \approx \frac{S}{V_{close}}.$$

From this it follows that $$\Delta t1 \approx \frac{1}{V_{close}}.$$

This means that time difference $\Delta t1$ is an extraordinarily reliable measure of the impact speed, at least in those cases where the two instants T0 and T1 may be ascertained with sufficient accuracy.

Figure 3:
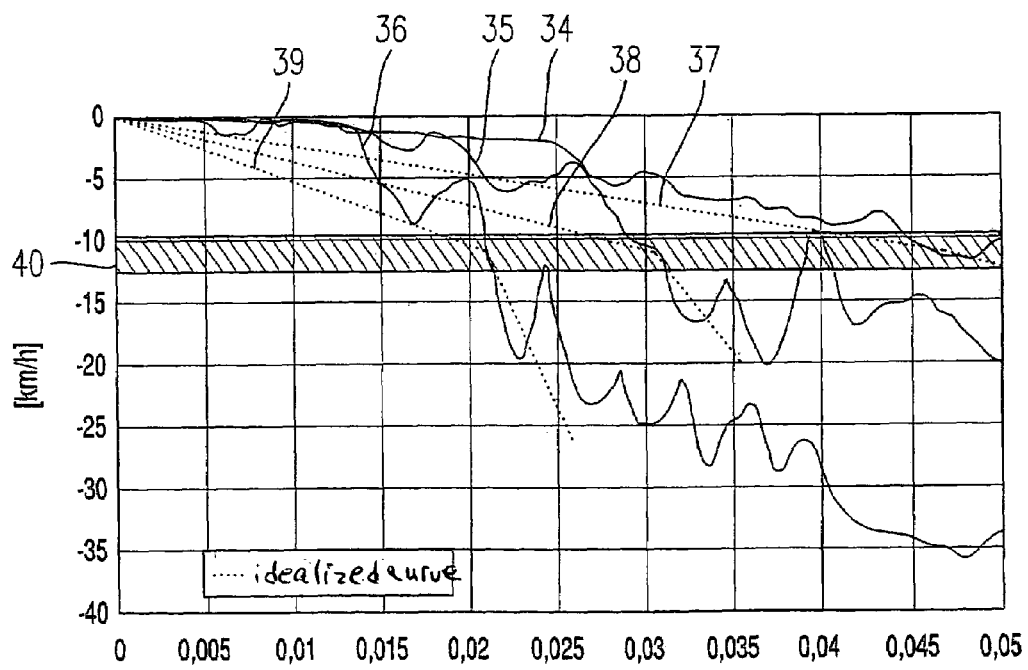
FIG. 3 schematically, the comparison of such signal profiles at different driving speeds.
Figure 4:
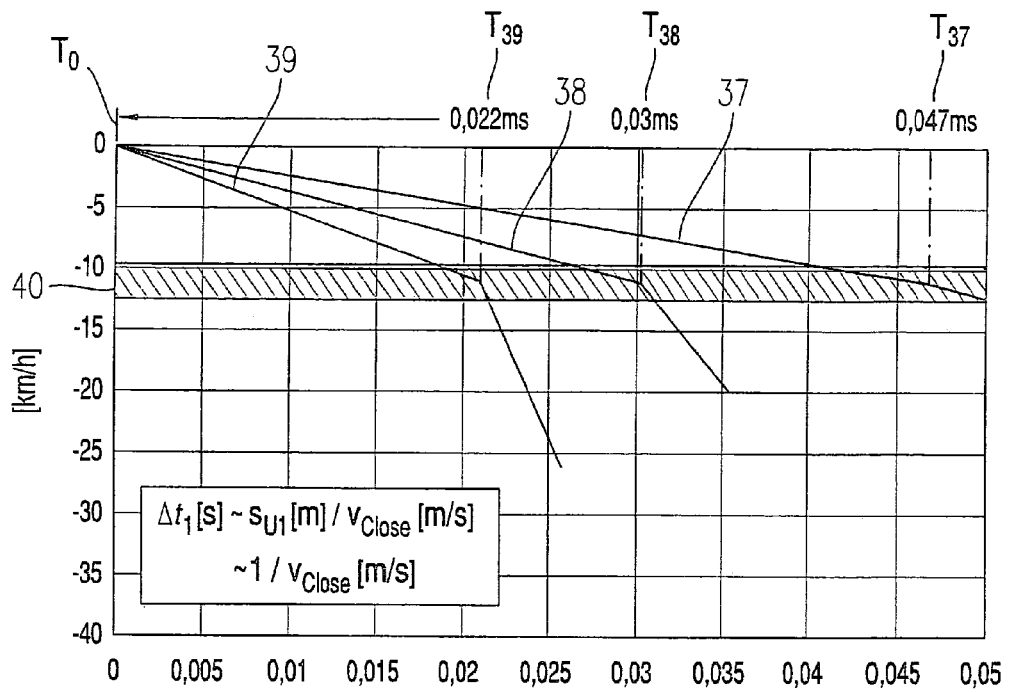
FIG. 4 schematically, the idealized representation of various acceleration-transition instants at different driving speeds in order to determine a measure of the impact velocity.

The difficulties arising in this context are first explained in greater detail with the aid of FIGS. 3 and 4. Analogously to FIG. 2, FIG. 3 shows typical measuring curves 34, 35 and 36 and the corresponding idealized curves 37, 38 and 39, represented by dotted lines. Measuring curve 34, and thus idealized curve 37, describes a front-end impact with 100% overlap at 15 km/h. Measuring curve 35, and corresponding, idealized curve 38, corresponds to a front-end impact with 100% overlap at 20 km/h. Measuring curve 36, and associated idealized curve 39, describe a front-end impact with 100% overlap at 30 km/h. Due to the previously mentioned measuring tolerances of ±10%, for example, the transition from the range of low delay to the range of heavy delay, which has been explained on the basis of FIG. 2, lies within a shaded, band-shaped region, which may be considered a gray zone 40, so that the detection of instant T1, and thus of time difference ΔT1, has this inherent uncertainty. This is again shown in FIG. 4, which shows the particular idealized curves in greater detail. However, it is quite obvious that despite the inaccuracies caused by gray zone 40 when determining the individual acceleration-transition instants T37, T38 and T39, these are very easy to distinguish from each other.

Furthermore, the measure for the impact velocity is able to be ascertained with a high degree of precision.

According to the present invention, it is possible to obtain the speed signal that is of interest here, and thus acceleration-transition instant T1 which is important in this context, by evaluating the acceleration signal from acceleration sensor 16. The acceleration signal (via line 17) is integrated in evaluation circuit 19 over time. Therefore, the velocity change per time unit may be determined by computation and acceleration-transition instant T1 established correspondingly when a marked change in the velocity per time unit is detected. Since this acceleration-transition instant T1 lies inside gray zone

40, that is, is within the range of a certain speed drop as can be gathered from FIGS. 3 and 4, it is also possible to utilize a threshold value of the speed drop to assess whether acceleration-instant T1 has been reached. This determination may be carried out in evaluation circuit 19 or also in control 9.

In order to then distinguish between two impact speeds that are in very close proximity to one another, it is also possible to establish time threshold values, which are expediently determined by crash tests: If the ascertained time difference is above a certain threshold value, lower impact speed $v_{close}$ is present. At low impact speeds, and at impact speeds that are in close mutual proximity, as mentioned earlier, an inaccuracy with respect to the detection of impact-onset instant T0 is negligible. Only when impact velocities must be discriminated that are very far apart, the precision in ascertaining impact-onset instant T0 may possibly be of some importance.

As mentioned earlier, impact-onset instant T0 may be determined with the aid of an impact switch 20 located very far in the front.

Another possibility is to utilize an acceleration sensor 25, which is usually assigned to control circuit 9 and integrated in the vehicle interior in trigger-control 9, and/or to utilize a separate acceleration sensor 26 mounted on the rigid support structure, this acceleration sensor being connected to evaluation circuit 19 (or to trigger-control circuit 9, indicated by a dotted line) via a line 27: If the acceleration at such an acceleration sensor 25, 26 of trigger control 9 or evaluation circuit 19 exceeds a low, fixed acceleration threshold that is above signals to be interpreted as noise signals, this is construed as the beginning of an impact, thereby establishing the mentioned impact-onset instant T0. The actual deviations therefrom are of negligible importance, at least inn the low vehicle velocities or impact speeds that are viewed and to be distinguished in the exemplary embodiment of a use.

As mentioned before, the signal from acceleration sensor 16 is utilized to determine acceleration-transition instant T1. If only one such acceleration sensors 16 is provided, it is expediently installed on the vehicle longitudinal axis. It is also possible that a plurality of acceleration sensors 16, preferably two, is provided symmetrically to the vehicle longitudinal axis, as mentioned earlier. In this case, the velocity is calculated from the maximum of the integral of the acceleration signals from both acceleration sensors 16.

Providing two such symmetrically arranged acceleration sensors 16 has another advantage, however, since the degree of overlap may be determined as well, which is important in connection with the aforementioned type approval testing.

Until at least one of the two front-side acceleration sensors 16 has reached acceleration-transition instant T1, i.e., an integral-value threshold, the individual integral values that have been ascertained separately are compared to each other in a step-by-step manner. This is not done continuously, but carried out at time intervals. In each comparison it is evaluated whether one of the integral values is slightly higher than the other integral value. If this is the case, a running counter content is increased; otherwise, this counter content is decreased. Upon reaching acceleration-transition instant T1, that is, a corresponding integral threshold, the counter content is compared to a fixed threshold value, high counter contents indicating only partial overlap of less than 60%, provided a sufficient number of comparisons, but at least ten comparisons, have been implemented. One integral value is expediently multiplied by a constant that is between 1.1 and 1.2, the constant being ascertained vehicle(type)-specifically, possibly by means of crash tests. Another prerequisite is that the vehicle design provides symmetrical crumpling behavior in impacts with partial overlaps at the right or the left side only.

The multiplication by the constant improves the robustness of the overlap detection since a high noise level must be assumed as a result of the installation situation whose effect is compensated.

Figure 5:
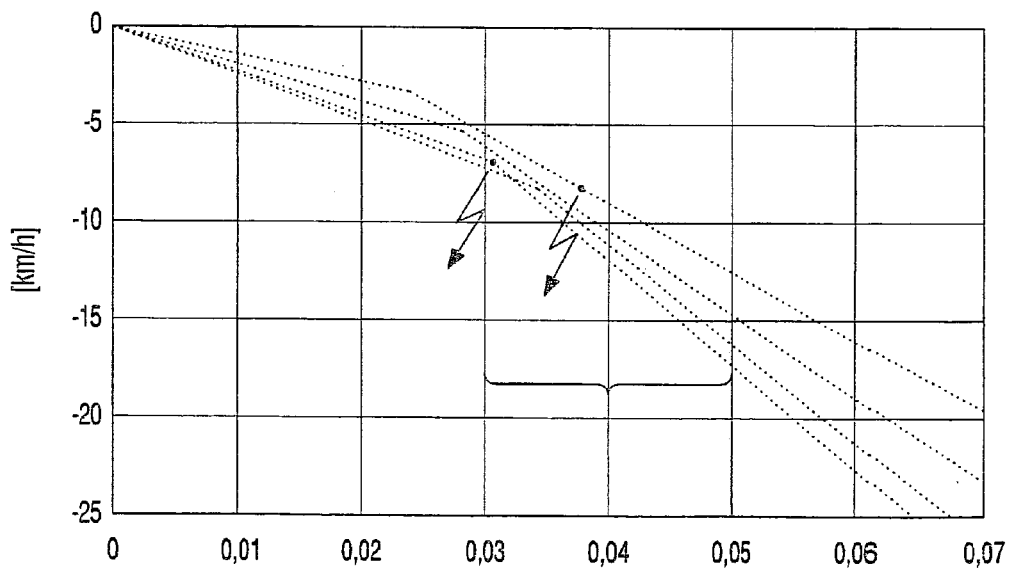
FIG. 5 schematically, the profile of the integral values in an acceleration sensing in the passenger cabin.

The degree of overlap and the rigidity of the obstacle influence the integral value ascertained by an/the central (single) acceleration sensor 25 or 26, respectively. Alternatively, acceleration sensor(s) 16 may be utilized as well. If two symmetrical acceleration sensors 16 are provided, an average value and/or a maximum value are/is then used for the evaluation. The integral value is highest in an overlap of 100% and an impact against a hard barrier as obstacle. By establishing a corresponding threshold, determined vehicle(-type) specifically, or by establishing an integral window, it will then be possible to infer the presence of the mentioned condition (100% overlap and impact against hard barrier). However, here, too, the crash crumple zone of the vehicle has an effect on such a comparison procedure, and even an extraordinarily high effect. This is illustrated by the representation in FIG. 5, in which critical overlap points are indicated by danger arrows. From left to right (lower region), the idealized curves in each case illustrate the behavior in an impact against a rigid barrier with 100% overlap at a speed of 20 km/h, 25 km/h, 26 km/h and 30 km/h. Thus, utilizing the integral value in the case of a single central acceleration sensor 25 or 26 is sufficient to determine the overlap in those cases where the demands on accuracy are low, yet it renders an essential contribution to the plausibility check.

The information regarding the impact velocity ascertained according to the present invention on the basis of the at least one output signal 15 from evaluation circuit 19 may also be supplied to other devices of a motor vehicle 2, as additional output signals 23, which are possibly subjected to further analysis. Evaluation circuit 19 may also utilize additional input signals 22 in order to be able to generate output signals 15 and/or additional output signals 23.

Of course, evaluation circuit 19 and control circuit 9 may be integrated to form a single component.

A typical consideration of additional input signals 22, 24 is a plausibility evaluation on the basis of the vehicle's own velocity. However, the vehicle's own velocity is meaningful only for impact processes against stationary, barrier-type obstacles. As a result, it is only meaningful in crash tests, but thus in the aforementioned type-approval testing as well. In the case of non-stationary barriers, other situations result as a function of the actual relative velocity between the obstacle and the vehicle in question.

In the low vehicle velocities and impact speeds viewed in the use, the integral value requires that the vehicle structure have sufficient stability so as to retain the sensing direction (of acceleration sensors 16 and 25), in an overlap of 100% in any case. From this, it is possible to derive a plausibility check to the effect that, if the estimated impact velocity is clearly exceeded, for instance by more than 10%, another impact situation must be assumed, namely an impact at high speed against a soft obstacle.

It is useful, however, to use precrash-sensory arrays known per se, which, on the basis of special criteria, make predictions with respect to an impact to be expected. Furthermore, it is expedient to ascertain the relative velocity with respect to the object that may constitute an obstacle and to take it into account.

On the basis of the mentioned determination of a measure for the impact velocity, the reliability in the triggering of an airbag 7 is able to be increased. In particular, the data corresponding to the impact velocity may be utilized in various triggering algorithms in order to influence the triggering conditions of passive safety systems, such as airbag 7. For example, when a certain impact velocity is detected, the triggering of a second airbag stage may be prevented or substantially delayed.

The present invention is particularly suited for a discrimination among impact velocities that are in very close proximity to each other, in particular in a front-side impact (corresponding to an impact angle of 0°) and also in an overlap of 100% in an impact against a rigid obstacle. The present invention is therefore particularly suited to achieve the required discrimination between an impact at 26 km/h and an impact at 32 km/h according to U.S. regulation NHTSA 208, in particular without a negative influence by dispersions due to aging and the like.

What is claimed is:

1. A method for controlling a triggering of a passive safety system in response to a detection of criteria that are to be interpreted as an existence of a dangerous impact, comprising:
    detecting an instant when the impact of a vehicle against an obstacle begins, the instant being ascertained at the time at which an acceleration of a rigid support structure of the vehicle transitions from a light acceleration to a heavy acceleration, the instant being associated with an impact-onset instant and an acceleration-transition instant;
    ascertaining a time difference between the impact-onset instant and the acceleration-transition instant;
    inferring an impact velocity from the time difference, the criteria including the impact velocity; and
    measuring a vehicle velocity and subjecting the vehicle velocity to a plausibility check.

2. The method as recited in claim 1, wherein:
    the passive safety system includes an airbag in the vehicle.

3. The method as recited in claim 1, further comprising:
    ascertaining an integral value of an acceleration signal from an acceleration sensor disposed on the rigid support structure; and
    if a low threshold value that is above a noise level is exceeded by the integral value, inferring an impact onset.

4. The method as recited in claim 1, further comprising:
    comparing an integral value of an acceleration signal from an acceleration sensor disposed in a front region of a vehicle on the rigid support structure to a threshold value that, with respect to a predefined vehicle velocity, corresponds to a transition between the light acceleration and the heavy acceleration, the transition being inferred when the threshold value is exceeded.

5. The method as recited in claim 4, further comprising:
    empirically establishing the threshold value by impact testing.

6. A method for controlling a triggering of a passive safety system in response to a detection of criteria that are to be interpreted as an existence of a dangerous impact, comprising:
    detecting an instant when the impact of a vehicle against an obstacle begins, the instant being ascertained at the time at which an acceleration of a rigid support structure of the vehicle transitions from a light acceleration to a heavy acceleration, the instant being associated with an impact-onset instant and an acceleration-transition instant;
    ascertaining a time difference between the impact-onset instant and the acceleration-transition instant;
    inferring an impact velocity from the time difference, the criteria including the impact velocity; and
    comparing integral values of acceleration signals from two of a plurality of acceleration sensors disposed symmetrically to a vehicle longitudinal axis in a front region of the vehicle on the rigid support structure;
    determining in each case a mutual deviation according to an operational sign; and
    performing at least one of the following:
        ascertaining at the acceleration-transition instant of one of the acceleration sensors a number of differences of the operational-sign deviations, a magnitude of the number of the differences corresponding to a measure of an overlap, and
        comparing a magnitude of an integral value of an acceleration signal from a central acceleration sensor disposed in a front region of the vehicle on the rigid support structure on the vehicle longitudinal axis to empirically determined threshold values, each threshold value corresponding to a measure of the overlap at a predefined rigidity of the obstacle.

7. The method as recited in claim 3, wherein the vehicle velocity and the integral value are subjected to the plausibility check as to whether the integral value is utilizable in a meaningful way.

8. A device for controlling a triggering of a passive safety system in response to a detection of criteria that are to be interpreted as an existence of a dangerous impact, comprising:
    at least one acceleration sensor located in a front region and on a support structure of a vehicle to detect an instant when the impact of a vehicle against an obstacle begins, the instant being ascertained at the time at which an acceleration of a rigid support structure of the vehicle transitions from a light acceleration to a heavy acceleration, the instant being associated with an impact-onset instant and an acceleration-transition instant;
    an impact sensor located on the vehicle to detect an onset of the impact of the vehicle against an obstacle; and
    an evaluation circuit for ascertaining a time difference between the impact-onset instant and the acceleration-transition instant, inferring an impact velocity from the time difference, the criteria including the impact velocity, and measuring a vehicle velocity and subjecting the vehicle velocity to a plausibility check;
    wherein the impact sensor includes an impact switch.

9. The device as recited in claim 8, wherein:
    the passive safety system includes an airbag in the vehicle.

10. The device as recited in claim 8, wherein the closing of the impact switch establishes the impact-onset instant.

11. The device as recited in claim 8, further comprising:
    another acceleration sensor within which is formed the impact sensor, the other acceleration sensor being disposed on the support structure,
    wherein: the impact-onset instant is established by an integral value of an acceleration signal from the other acceleration sensor exceeding a minimum-velocity threshold value.

12. The device as recited in claim 8, wherein:
    the evaluation circuit compares an integral value of an acceleration signal detected by the at least one acceleration sensor with a threshold value, a signal that corresponds to the threshold value being exceeded establishing the acceleration-transition instant.

13. A device for controlling a triggering of a passive safety system in response to a detection of criteria that are to be interpreted as an existence of a dangerous impact, comprising:

at least one acceleration sensor located in a front region and on a support structure of a vehicle to detect a transition from a light acceleration to a heavy acceleration:

an impact sensor located on the vehicle to detect an onset of the impact of the vehicle against an obstacle; and an evaluation circuit for determining a time difference between an impact-onset instant and an acceleration-transition instant as a measure of an impact velocity, the evaluation circuit using the time difference to control the triggering;

wherein the impact sensor includes an impact switch, wherein the evaluation circuit compares an integral value of an acceleration signal detected by the at least one acceleration sensor with a threshold value, a signal that corresponds to the threshold value being exceeded establishing the acceleration-transition instant, and wherein the threshold value is empirically established by impact testing.

14. The device as recited in claim 8 wherein:

the at least one acceleration sensor includes a plurality of acceleration sensors disposed in the front region of the vehicle and symmetrically arranged with respect to a vehicle longitudinal axis, and the evaluation circuit utilizes acceleration signals from the acceleration sensors to detect an acceleration transition.

15. device for controlling a triggering of a passive safety system in response to a detection of criteria that are to be interpreted as an existence of a dangerous impact, comprising:

at least one acceleration sensor located in a front region and on a support structure of a vehicle to detect a transition from a light acceleration to a heavy acceleration;

an impact sensor located on the vehicle to detect an onset of the impact of the vehicle against an obstacle; and an evaluation circuit for determining a time difference between an impact-onset instant and an acceleration-transition instant as a measure of an impact velocity, the evaluation circuit using the time difference to control the triggering;

wherein the impact sensor includes an impact switch, wherein the at least one acceleration sensor includes a plurality of acceleration sensors disposed in the front region of the vehicle and symmetrically arranged with respect to a vehicle longitudinal axis, and the evaluation circuit utilizes acceleration signals from the acceleration sensors to detect an acceleration transition, and wherein at least one of: integral values of the acceleration signals from at least two of the acceleration sensors are compared repeatedly at time intervals, a mutual deviation being determined according to an operational sign, at the acceleration-transition instant, the number of differences of operational-sign deviations being ascertained, the magnitude of the number of differences corresponding to a measure of the overlap, and a magnitude of an integral value of the acceleration signal from one of the acceleration sensors centrally disposed with respect to the vehicle longitudinal axis is compared to empirically determined threshold values, each threshold value corresponding to a measure of the overlap at a predefined rigidity of the obstacle.

16. The device as recited in claim 15, further comprising:

an arrangement for detecting additional criteria, including a vehicle velocity, a differential speed with respect to the obstacle; and an arrangement for utilizing the additional criteria to exclude an erroneous interpretation of the detected criteria.

17. The method as recited in claim 1, wherein:
the method is used in a discrimination of an impact process at a low impact speed.

18. The method as recited in claim 17, wherein:
the method is used in a crash test.

19. The device as recited in claim 8, wherein:
the device is used in a discrimination of an impact process at a low impact speed.

20. The device as recited in claim 19, wherein:
the device is used in a crash test.

21. The method as recited in claim 1 wherein:
the method is used in a discrimination of an impact with 100% overlap against rigid obstacles.

22. The method as recited in claim 21, wherein:
the method is used in a crash test.

23. The device as recited in claim 8, wherein:
the device is used in a discrimination of an impact with 100% overlap against rigid obstacles.

24. The device as recited in claim 23, wherein:
the device is used in a crash test.

* * * * *